Feb. 24, 1959     F. M. SMITH     2,875,116

CONVEYOR BELT

Filed May 25, 1955

INVENTOR.
FLOYD M. SMITH
BY
W. A. Fraser
ATTY-

United States Patent Office 2,875,116
Patented Feb. 24, 1959

2,875,116
CONVEYOR BELT

Floyd M. Smith, Akron, Ohio, assignor to The Firestone Tire & Rubber Company, Akron, Ohio, a corporation of Ohio Application May 25, 1955, Serial No. 510,932

1 Claim. (Cl. 154—52.1)

This invention relates to an improved conveyor belt of special utility when used in conjunction with electronic heating equipment.

Electronic heating equipment has been commercially employed for rapidly heating rubber and plastic articles to dry and/or cure same. It has been found feasible to carry the articles being treated through the electronic field of the heating apparatus by means of a conveyor belt. Ordinary rubberized fabric belts have been found to be unsatisfactory in this application, because of the poor resistance of rubber compounds to oxidation and heat-degradation. An attempt has been made to utilize the more oxidation-resistant neoprene in place of rubber in such conveyor belts, but substantial use of neoprene interferes with efficient utilization of the high frequency electrical field of the electronic apparatus because of neoprene's high power factor. In addition, the usual neoprene compound continues to cure and becomes brittle. The surface of a neoprene belt thus becomes rough, adversely affecting the surface finish of certain products heated thereon. Also the neoprene belt fails prematurely because of the overcuring caused by the electronic field.

Figure 1:
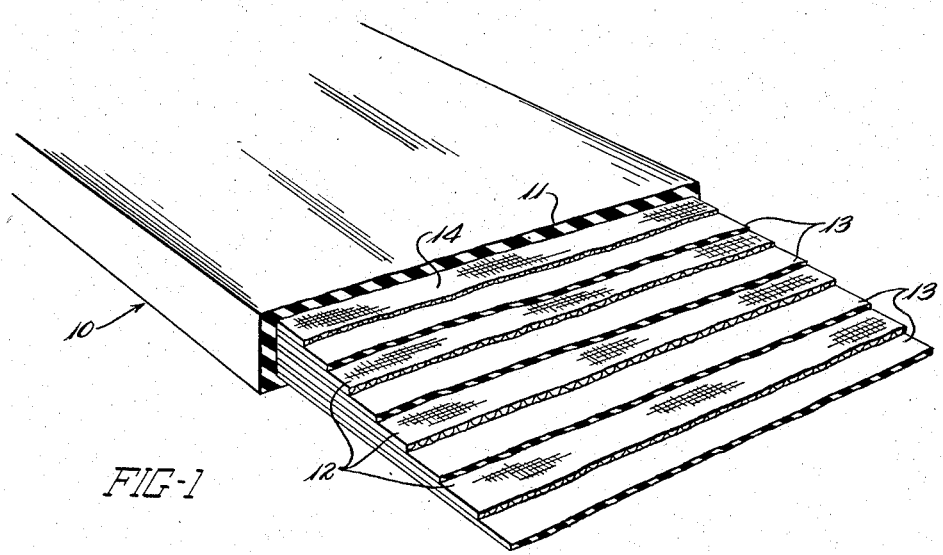
Figure 2:
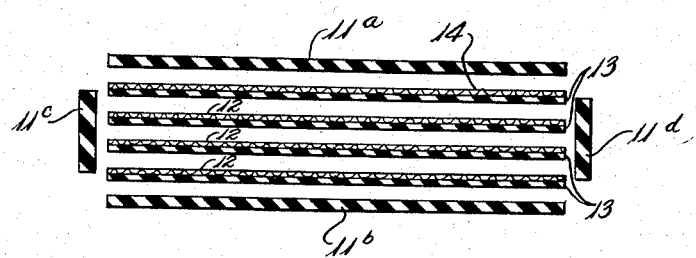

It is an object of the present invention to provide a conveyor belt possessing a low power factor together with excellent resistance to oxidation and heat degradation; it is also an object to provide a conveyor belt possessing an extremely long useful life when exposed to operating conditions of heat and humidity; it is also an object to provide a conveyor belt having no adverse effect on rubber and/or plastic articles conveyed thereon. Other objects will be manifest in the following description of the invention and in the accompanying drawing, in which:

Fig. 1 is a perspective view of a portion of a belt embodying the invention, the layers of material of the belt being broken away in steps to illustrate the belt construction; and Fig. 2 is an exploded sectional view of the component parts of a belt embodying the invention prior to the assembly and vulcanization thereof.

Referring to Fig. 1 of the drawing, a conveyor belt 10 comprises a rubbery cover 11 encasing the body of the belt, made up of strain members separated from each other by layers of rubbery compositions. The essential strain members are represented by heavy canvas or other strong fabric 12 interleaved with rubbery body plies 13. A breaker ply 14 of greater elasticity than the strain members 12, and suitably of a lighter weight cross woven fabric is positioned adjacent to the outer portion of the belt cover 11, opposite from the portion of the belt designed to contact conveyor rolls.

A belt such as the one shown in Fig. 1 can be manufactured from the component parts as shown in Fig. 2, by assembly and vulcanization in a manner well known in the art. Referring to Fig. 2, strips of cover stock 11a, 11b, 11c and 11d are designed to cover the body of the belt after the body is assembled. Alternatively, 11c and/or 11d can be integral with 11a and/or 11b. The body of the belt 10 is suitably made up of plies of cross woven strain members 12, impregnated with an adhesive type of rubbery composition, as by a conventional dipping process or by frictioning fabric 12 in a calender. A rubbery body ply 13 is adhered in face-to-face relation to each strain member 12, as by skim-coating the strain member by means of a calender. Likewise the breaker ply 14 is impregnated with an adhesive stock and is skim-coated with a body ply 13; such skim-coating is optional in the event that (1) a skim-coat is placed on top of the topmost fabric member 12 or (2) the order of occurrence of fabric layers 12 and rubbery plies 13 is reversed from the order shown in Fig. 2. The various rubberized fabric plies are assembled in the order shown in Figs. 1 and 2, the strips of cover stock are pressed onto the belt body, and the assembled green belt is vulcanized either by use of a mold or not, as is well known in the art.

An important feature of the belt of the invention is that the rubbery cover stock thereof is a special Butyl rubber composition containing substantially no carbon black and also no more than a relatively small proportion of neoprene or other supplemental rubbery polymer. The rubbery stocks in the body of the belt are preferably also Butyl rubber formulations, in order to provide a belt having a low power factor. Carbon black is preferably excluded from the belt, as its presence increases the power factor of a belt. Neoprene is likewise excluded or held to a small amount, as a substantial amount of neoprene raises the power factor of the belt to an objectionable value when the belt is used with electronic heating equipment. Furthermore a belt cover substantially of neoprene continues to cure during use of the belt until objectionable cracks develop. However, it has been found that a small amount of neoprene, preferably not over 10% of the rubbery components of the composition, imparts to the composition desirable resistance to heat degradation. The cover stock and the belt body stock (skim stock) in accordance with the invention is illustrated by the following formula, in which parts are given by weight, and in which the permissible range of each ingredient is given in parentheses following a preferred value:

Formula I

| Ingredients: | Parts by weight |
|---|---|
| Butyl rubber | 95 (90–100) |
| Neoprene | 5 (0–10) |
| Silica | 30 (15–60) |
| Zinc oxide | 20 (3–30) |
| Dibenzo GMF [1] | 3 (1–8) |
| 2,2′-dithio bis-benzothiazole [2] | 4 (2–6) |
| Sulfur | 1 (0.5–4) |
| Wax [3] | 1 (0.1–10) |

[1] Product of Naugatuck Chemicals reported to be p,p′-dibenzoyl quinone-dioxime, a non-sulfur vulcanizing agent.
[2] Other polysulfide rubber activators can be used, including 2,2′-dithiobis (4,5-dimethyl thiazole), 2,2′-dithiobis (4-ethyl thiazole) and tetramethyl thiuram disulfide.
[3] Paraffin wax or a low molecular weight polyethylene wax.

A preferred adhesive friction stock for use in the invention is, similarly, in accordance with the following formula:

Formula II

| Ingredients: | Parts by weight |
|---|---|
| Butyl rubber | 95 (90–100) |
| Neoprene | 5 (0–10) |
| Silica | 30 (15–60) |
| Zinc oxide | 5 (1–20) |
| Clay | 20 (5–40) |
| Tackifier [1] | 15 (3–25) |
| Dibenzo GMF | 3 (1–8) |
| Polysulfide [2] | 4 (2–6) |
| Sulfur | 1 (0.1–4) |

[1] E. g., Polybutene No. 128 supplied by Oronite Chemical Company.
[2] E. g., 2,2′-dithiobis-benzothiazole, etc., as in Formula I.

Buty rubber employed in the present invention is the Butyl rubber of commerce, manufactured for years in U. S. A. Government plants under the designation GR–I. This rubbery material is obtained by copolymerizing a major proportion of isobutylene with a minor proportion of a conjugated diolefin such as butadiene or isoprene, the polymerization being carried out at extremely low temperatures in the presence of a Friedel-Crafts catalyst, as disclosed, for example, in U. S. Patent 2,356,128.

The neoprene utilized in the present invention is the ordinary neoprene of commerce, originally developed by E. I. du Pont de Nemours & Co., Inc., and produced in U. S. A. Government plants during the last war under the designation GR–M. The neoprenes are polymers or copolymers essentially based upon the monomer chloroprene, which has the chemical name 2-chloro-butadiene-1,3.

Although neoprene is a preferred supplemental rubbery polymer for improving the heat resistance of the Butyl rubber stocks of the invention, other vulcanizable rubbery polymers can be substituted with some success for neoprene. Among these supplemental polymers GR–S (a rubbery polymer of a major portion of a conjugated diolefin and a minor portion of a styrene) is of considerable value. Other supplemental rubbery polymers to be used to the extent of no more than 10 parts per 90 parts of Butyl rubber includes GR–A (a rubbery polymer of a major portion of a conjugated diolefin and a minor portion of an acrylonitrile), polybutadiene-1,3, polyisoprene and chloro-sulfonated polyethylene.

The silica employed in the above formulas is preferably of very fine particle size, such as the commercially available precipitated silicas, and also the silicas produced by combustion of organic silicon compounds.

A conveyor belt produced in accordance with the formulas presented above, and in accordance with the descriptions of the drawing, gives excellent service as a conveyor for rubber and/or plastic articles dried and/or cured by passage through the high frequency electrical field of an electronic heating unit. Unlike many conventional conveyor belts and other rubbery compounds heretofore used in various products, the special Butyl rubber composition utilized in the cover stock of the present belt does not discolor white or light colored articles conveyed on the belt. The belt is extremely resistant to oxidation or to embrittlement or undue softening resulting from prolonged heating, especially in the presence of air.

The Butyl rubber compositions of the invention possess power factors substantially lower than the power factor of any neoprene compound or of conventional black rubber compounds. Whereas the power factor of typical neoprene belt compounds formerly employed exceeds 0.1000 and often run 0.1240 and higher, the power factor values of the light-colored Butyl rubber compounds of the invention are in the range of 0.0020 to 0.0350.

The strain members 12 (and breaker ply 14) usually consist of cotton fabric or rayon fabric. Newer types of belting fabric suitable for use in the invention include fabric having a cotton warp and rayon fill and also fabric having a rayon warp and nylon fill.

What is claimed is:

A conveyor belt comprising strain members adhered to a rubbery composition A essentially composed of the ingredients listed in the following formula in which parts are by weight:

A

| | |
|---|---|
| Butyl rubber | 95 |
| Neoprene | 5 |
| Silica | 30 |
| Zinc oxide | 5 |
| Clay | 20 |
| Polybutene tackifier | 3 to 25 |
| Vulcanizing agent | 2 to 8 | top and bottom faces of the belt covering said strain members and consisting essentially of a rubbery composition B essentially composed of the ingredients listed in the following formula in which parts are by weight:

B

| | |
|---|---|
| Butyl rubber | 95 |
| Neoprene | 5 |
| Silica | 15–60 |
| Zinc oxide | 3–30 |
| Vulcanizing agent | 2 to 8 | the Butyl rubber being a copolymer of a major proportion of isobutylene and a minor proportion of a conjugated diolefin, and the power factors of composition A and of composition B being in the range of 0.0020 to 0.0350.

References Cited in the file of this patent

UNITED STATES PATENTS

| | | |
|---|---|---|
| 2,633,227 | Hutchins | Mar. 31, 1953 |
| 2,697,773 | Gordon | Dec. 21, 1954 |
| 2,720,495 | Phreaner | Oct. 11, 1955 |

FOREIGN PATENTS

| | | |
|---|---|---|
| 714,121 | Great Britain | Aug. 25, 1954 |